United States Patent [19]

Christiansen

[11] 4,045,162

[45] Aug. 30, 1977

[54] METHOD OF BURNING GRANULAR OR PULVERULENT RAW MATERIAL AND KILN PLANT THEREFOR

[75] Inventor: Søren Bent Christiansen, Copenhagen Valby, Denmark

[73] Assignee: F. L. Smidth & Co., Cresskill, N.J.

[21] Appl. No.: 626,478

[22] Filed: Oct. 28, 1975

[30] Foreign Application Priority Data

Oct. 30, 1974 United Kingdom ............... 47021/74

[51] Int. Cl.² ............................................. F27B 7/02
[52] U.S. Cl. ..................................... 432/14; 432/106; 106/100
[58] Field of Search ................... 432/14, 15, 105, 106, 432/117; 34/57 R; 106/100

[56] References Cited

U.S. PATENT DOCUMENTS

| | | | |
|---|---|---|---|
| 3,881,861 | 5/1975 | Ritzmann | 432/14 |
| 3,914,098 | 10/1975 | Kano et al. | 432/106 |
| 3,938,949 | 2/1976 | Christiansen | 432/14 |
| 3,940,241 | 2/1976 | Hond | 432/106 |
| 3,947,238 | 3/1976 | Fukuda et al. | 432/106 |

*Primary Examiner*—John J. Camby
*Assistant Examiner*—Henry C. Yuen
*Attorney, Agent, or Firm*—Pennie & Edmonds

[57] ABSTRACT

A method is disclosed for heat treating granular or pulverulent raw material wherein the raw material is directed to a heat exchanger having at least two preheating units operating in parallel, each preheating unit having at least a first preheating stage and at least a lowermost calcination stage to effect a preheating and at least partial calcination of the material. The preheated, at least partially calcined material is fed from the heat exchanger into a kiln and undergoes a sintering process in the kiln. The sintered material is directed from the kiln into a cooling means in which cooling air is directed in a manner to effect a heat exchange between the material and the cooling air. The method further comprises dividing the heated cooling air exiting the cooling means and directing a portion of the heated cooling air to at least one of the calcination stages of the heat exchanger and directing a portion thereof to the kiln in excess of that required to support combustion of fuel in the kiln for the sintering process thereby intensifying the effectiveness of a material cooling zone within the kiln proper. Hot kiln exit gases are directed to at least one of the calcination stages and fuel is directed to at least one of the calcination stages to support combustion with preheated cooling air to provide supplementary heating of the material and at least partially calcining of the preheated material. An apparatus for practicing the inventive method is also disclosed.

33 Claims, 4 Drawing Figures

METHOD OF BURNING GRANULAR OR PULVERULENT RAW MATERIAL AND KILN PLANT THEREFOR

BACKGROUND OF THE INVENTION

1. Field of the Invention

This invention relates to a plant and method for preheating, calcining, and sintering granular or pulverulent raw materials, such as cement raw meal.

2. Description of the Prior Art

In the technology to the heat treatment of granular or pulverulent raw materials such as cement raw meal, it is always desirable to utilize heat energy as much as possible. My, commonly assigned U.S. Pat. No. 3,864,075 dated Feb. 14. 1975, discloses a plant which is characterized by the division of the hot waste cooling air leaving the cooler so that a portion is directed as combustion air to the burner of the kiln, and a portion is directed to the air inlet of one heat exchanger unit. The gas inlet of another heat exchanger unit is connected to an exhaust gas outlet of the kiln and the heat exchanger units each have at or near its gas (or air) outlet end, means associated therewith for controlling the air or gas flow through that unit and hence the division of the heated cooling air.

In a preferred embodiment of my earlier development, one heat exchanger unit has an air inlet to which hot waste cooling air is directed, with means being provided for increasing the heat content of the air. The other heat exchanger unit—the gas inlet of which, exhaust gas from the kiln is directed—has means for discharging the preheated material into the first mentioned heat exchanger unit at or near its inlet end.

German Publication No. 2,262,213 to Rohrbach (laid open for inspection Dec. 12, 1974) relates to a method of heat treating such raw materials by directing preheated raw materials from several strings of cyclone-type suspension preheaters to a single calcinator for clacining material prior to feeding it into a kiln. Waste gases from a clinker cooler are directed to the preheaters to utilize the haet therefrom in preheating the raw material.

Commonly assinged, copending application Ser. No. 603,867, filed Aug. 11, 1975 relates to a method for heat treating such pulverous raw materials prior to subjecting them to further heat treatment in a kiln by dividing the gas flow and the raw meal flow into substantially equal divisional flows, with each flow being associated with a sub-stage of a final stage of a preheater. Other related patents—which were considered in the examination of my U.S. Pat. No. 3,864,075 —are as follows: U.S. Pat. No. 1,817,048 to Washburn; U.S. Pat. No. 3,037,757 to Deussner; U.S. Pat. No. 3,452,968 to Shimizu et al.; and U.S. Pat. No. 3,664,650 to Weber et al.

If the granular or pulverulent material such as cement raw meal is to be treated according to prior art methods, at least the greater part of the calcination process will take place almost exclusively near the air inlet end of the heat exchanger unit which is fed with hot waste cooling air. Also, the combustion of the fuel—nourished by the wate cooling air—required for performing the calcination process will take place in that locality. No worthwhile calcination will take place in the kiln nor in the heat exchanger unit which is fed with exhaust gas from the kiln.

With the earlier arrangements, the amount of hot waste cooling air drawn through the kiln per time unit is small and amounts only to that which contains enough oxygen to nourish the combustion of fuel at the burner in the kiln for carrying out the sintering. The remaining part of the hot waste cooling air will by-pass the kiln. and be led to the heat exchanger unit in which the calcination process is effected. This may result in the so-called pre-cooling zone located in the rotary kiln betweeen the mouth of its burner pipe and the clinker discharger outlet or outlets (as the case may be) not functioning properly, i.e. the clinker will not be precooled to the desired extent before leaving the kiln, because the amount of cooling air passing through the pre-cooling zone is too small, and the clinker cooler may be damaged.

Another drawback arising from the reduced amount of gas drawn through the kiln and originating from the hot waste cooling air passed into the kiln is that the alkalis—which almost invariably will be released near the exhaust gas outlet end of a kiln for burning cement clinker—will be concentrated in a comparatively slight amount of combustion gas with the result that there will be a tendency to encrustration in the lower part of the riser pipe leading from the material inlet end of the kiln to the adjacent heat exchanger unit. I have developed a unique method and plant which avoids these drawbacks while providing a new and improved approach to heat treating such raw materials as cement raw meal.

SUMMARY OF THE INVENTION

In the accordance with my invention, a method of heat treating granular or pulverulent raw material comprises directing the raw material to a heat exchanger having at least two preheating units operating in parallel, each unit having at least a first preheating stage and at least a lowermost clacination stage to effect a preheating and at least partial calcination of the material. The method further comprises feeding preheated, at least partially calcined raw material from the heat exchanger into a kiln, and sintering the preheated, at least partially clacined material in the kiln. The method further comprises directing the sintered material from the kiln into a cooling means, and directing cooling air into the cooling means in a manner to effect a heat exchange between the sintered material and the cooling air. The heated cooling air exiting the cooling means is divided and directed as follows. A portion of the heated cooling air is directed to at least one of the calcination stages, and a portion is directed to the kiln. The portion directed to the kiln is in excess of the amount of air required to support combustion of fuel in the kiln of for the sintering process thereby intensifying the effectiveness a material cooling zone within a portion of the kiln so as to make it early cooling of the sintered material. The method further comprises directing kiln exit gases to at least one of the calcination stages, and directing fuel to at least one of the calcination stages thereby supporting combustion with said preheated cooling air to provide supplementary heating of the material and at least partially calcining the preheated material. In the preferred embodiment the method comprises controlling the division of waste cooling air between the kiln and the heat exchanger unit or units.

A plant is disclosed for heat treating granular or pulverulent raw material according to the inventive method, which comprises a heat exchanger having at least two preheating units operating in parallel relation, each preheating unit having at least a first preheater unit for preheating raw material, and at least a lowermost calcination chamber for at least partially calcining the preheated material. A kiln communicates with the heat exchanger and is adapted to receive preheated, at least partially calcined material from the heat exchanger for sintering, with means being provided in communicating relation with the material discharge end portion of the kiln to receive sintered material from the kiln for cooling the sintered material. The plant further comprises means for dividing waste heated cooling air leaving the cooling means and for directing at least one of the calcination chambers of the heat exchanger and a portion of the cooling air to the kiln in excess of the air required to support combustion in the kiln for the sintering process, the excess cooling air thereby intensifying the effectiveness of the cooling zone within the kiln for cooling the material burnt therein. The invention also comprises means to direct hot kiln exit gases to at least one calcination chamber of the heat exchanger, and means to supply fuel to at leat one of said calcination chambers to support combustion therein with said preheated cooling air to thereby provide supplementary heat for the material and to at least partially calcine the preheated material.

A significant distinction between the plant according to the present invention and the prior art developments, particularly my preferred arrangement shown in my U.S. Pat. No. 3,864,075, is that in my earlier development, a calcination chamber is provided only in the heat exchanger unit fed with waste cooling air whereas according to my present invention, a calcination chamber is provided in all of the heat exchanger units. With this feature, the amount of cooling air drawn into the rotary kiln per time unit will be increased by the amount required for carrying through the calcination process taking place in the heat exchanger unit or units connected to the kiln exhaust gas outlet.

With the present development the objects of my earlier invention are clearly preserved. In particular, it can be seen that my present invention preserves my earlier concept and enables an easy and effective control of the gas flow through the various heat exchanger units in combination with a combustion chamber associated with at least one of the preheater units. This control is enhanced if each has its own means—such as an adjustable fan or valve —for controlling the flow of gas or air through that unit. Alternatively if there is more than one of each kind unit (i.e. fed with air from the cooler or gas from the kiln) they may have a common control.

In one mode of operation, at least partly calcined raw material from the calcination chamber of each heat exchanger unit is fed directly into the kiln. With this arrangement it will be seen that the principle of the invention is fully untilized.

In an alternative mode of operation, the raw material treated in each heat exchanger unit fed with kiln exhaust gases is incompletely calcined in that unit and is fed from the calcination stage of that unit to the calcination stage of at least one heat exchanger unit, fed directly with waste cooling air from the cooler, for further calcination before being fed into the kiln. Such a mode of operation may be regarded as a hybrid of the method to be carried out in the preferred plant shown in my U.S. Pat. No. 3,864,075 and of the mode of operation described above in the preceding paragraph. This hybrid mode of operation may be found useful only when it is considered sufficient to increase the amount of gas drawn through the kiln to a limited extent. In such case raw material which has been preheated in a heat exchanger unit fed with exhaust gas from the kiln and has been slightly calcined in the calciner forming the last stage of that heat exchanger unit, will be directed into a claciner forming the last stage of a heat exchanger unit fed with waste cooling air from the clinker cooler so as to join raw material which has been preheated in the preceeding stages of that heat exchanger unit. In the last mentioned calciner all the material entering it, whether orginating from one source or the other, and whether being slightly calcined or only preheated, may be substantially fully calcined.

The calcination stage of each heat exchanger unit fed with kiln exhaust gases may be heated at least partly by the combustion of fuel in the kiln in excess of that required for carrying through the sintering process, or at least partly by the local combustion of fuel; the latter being preferred to avoid overheating of the kiln gas outlet if the calcination is to approach completion in that unit.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
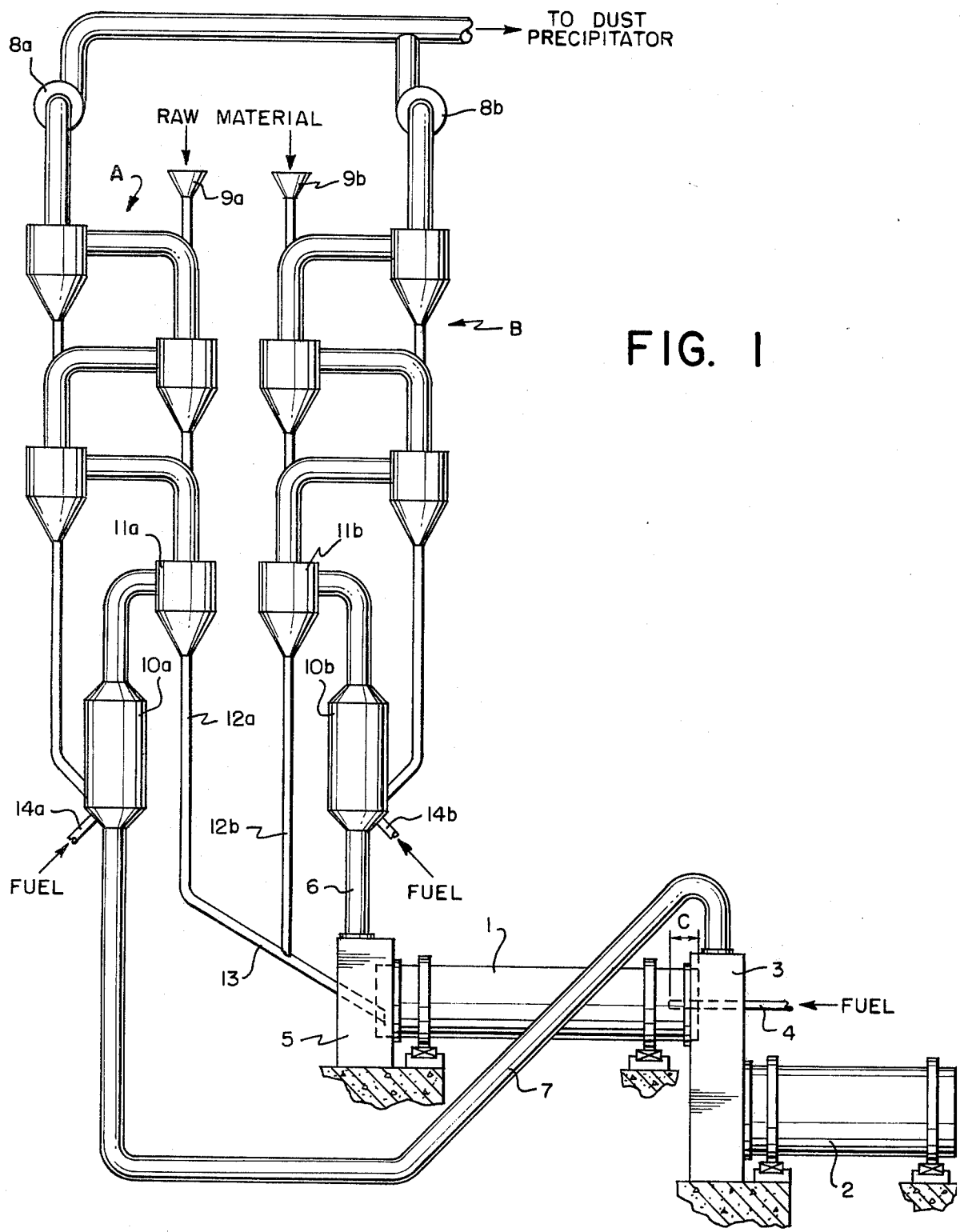
FIG. 1 is side elevation of a plant embodying the principles of the present invention having two separate heat exchanger units cooperating in parallel.

FIG. 1 shows a rotary kiln 1, the supporting and driving means of which are not illustrated, and a clinker cooler 2 which may be of any known type, one end of which receives hot clinker from the kiln 1 through guiding means, such as a hood 3. The hot clinker is advanced as a layer through the cooler while being traversed or swept by atmospheric cooling air with the result that the hot clinker is cooled and the cooling air is heated.

Part of the hot waste cooling air leaving the hood 3 is passed into the kiln 1 where the oxygen contained therein serves to nourish the combustion of the fuel blown into the kiln through a burner pipe 4 provided at the material outlet end of the kiln. In these circumstances a flame will be formed at the mouth of the burner pipe 4 and hot exhaust gas will pass up through the kiln countercurrent to the preheated, substantially completely calcined raw material which is fed into the kiln at its material inlet end. The material moves down through the kiln so as gradually to be chemically and physically changed under the influence of the heat in the kiln. The exhaust gases leave the kiln through a stationary hood 5 and a conduit 6.

The remaining part of the waste cooling air leaving the hood 3 passes into a conduit 7. Each of the conduits 7 and 6 is connected to the bottom stage of its own four-stage suspension heat exchanger unit, marked A and B, respectively. The units are identical, although mounted symmetrically, and are designed to cooperate in parallel in subjecting cement raw material to a heat treatment prior to its entry into the rotary kiln 1. For this purpose each of the units is at its top connected to the suction side of a fan, 8a and 8b, respectively, which draws heated used cooling air and exhaust gas, respectively, through units A and B. To enable an independent control of the amount of air or gas, respectively, sucked through A and B per time-unit, the fans 8a and 8b are either designed for independent variation of their number of revolutions or they are each equipped with a regulable damper. The delivery side of the two fans is connected to a common and conventional dust precipitator not shown.

Cement raw material to be heat-treated in the units A and B is introduced in dosed quantities through feed pipes 9a and 9b. The three first stages of units A and B include a three-stage suspension preheater of conventional cyclone type comprising in each stage, a riser pipe in which heat exchange takes place between hot waste cooling air or kiln exhaust gas, as the case may be, and relatively cold granular or pulverous cement raw material. The three first stages also include a cyclone separator in which the preheated raw material is separated from the air or gas in which it was suspended in the riser pipe.

The last stage of units A and B constitute a calcination state in which preheated cement raw material discharged from the bottom of the cyclone separator of the last preheater stage is subjected to an almost complete calcination, while suspended in heated used cooling air from conduit 7 or kiln exhaust gas from conduit 6 as the case may be. Each calcination stage consists of the calcination chamber proper, 10a and 10b, respectively, and a cyclone separator, 11a and 11b, respectively, for separating the almost fully calcined raw material from the air or gas in which it was suspended during the calcination process. From the bottom of each of the cyclone separators, 11a and 11b, extends a pipe, 12a and 12b, respectively, the free end of which opens into a common pipe 13 which again, passing through hood 5, extends into the inlet end of rotary kiln 1.

Fuel supply pipes 14a and 14b serve to intorduce fuel into the calcination chambers 10a and 10b, respectively, for carrying through the calcination chambers 10a and 10b, respectively, for carrying through the calcination process. The combustion in chamber 10a is nourished by oxygen contained in heated, used cooling air taken from the clinker cooler 2 along the path 2, 3, 7 and the combustion in chamber 10b is nourished by oxygen contained in the exhaust gas taken from the rotary kiln 1 along the path 1, 5, 6. In the latter case the oxygen does, in fact, also originate from the cooler 2, from which it has taken the path 2, 3, 1, 5, 6.

A significant feature of the present invention is that the amount of hot waste cooling air (containing about 20 percent oxygen) which is in excess of the amount of oxygen containing gas sufficient to nourish the combustion of the fuel supplied through the burner pipe 4 must actually be passed from the cooler 2 and through the hood 3, the kiln 1, the hood 5 and the conduit 6 into the calcination chamber 10b in order to nourish the combustion of the fuel added through supply pipe 14b. The raw material passed through pipe 13 into the rotary kiln 1 is fully —or almost fully —calcined and will be subjected to a finishing heat treatment in the kiln which transforms the raw material into cement clinker. If the raw material on entering the kiln is not fully calcined, the first step of the heat treatment in the kiln will be a completion of the calcination process. In any case, the main process performed in the kiln is a sintering process, the end product of which is cement clinker.

While the calcination process is an endothermic process requiring a considerable amount of heat for its performance (which takes place at about 850° C), the sintering process is an exothermic process requiring only an amount of heat necessary for achieving the sintering process temperature (about 1450° C) and for covering the heat losses. The calcination process, therefore, not only requires more fuel for its performance than does the sintering process, but also more combustion air is needed for nourishing the combustion of the requisite amount of fuel. A rule of thumb indicates that twice as much combustion air is required for the calcination process as for the sintering process. In other words, of the amount of oxygen contained in the heated used cooling air originating from the clinker cooler, two thirds is utilized in the calcination process and one third in the sintering process.

The last process carried through in the rotary kiln (after the sintering) is a pre-cooling of the clinker just produced. This pre-cooling actually takes place in the cooling zone of the kiln extending from the cross-section of the kiln which is flush with the mouth of the burner pipe 4 to the outlet end of the kiln taken in the direction of travel of the material. For example, in FIG. 1, this pre-cooling zone is designated as zone C. The raw material is conveyed down through the kiln because of its inclination and by the time it reaches the point corresponding to a cross-sectional plane aligned with the mouth of the burner pipe, it has been transformed into cement clinker.

On advancing further down the kiln, through the pre-cooling zone C, a cooling of the clinker is initiated by means of used cooling air from the clinker cooler 2 passing through the hood 3, into the kiln and inside the kiln in countercurrent to the advancing clinker layer. The pre-cooled clinker will drop from the outlet end of the kiln inside the hood 3 into (or onto, as the case may be, depending upon the type of cooler involved) the clinker cooler so as to be finally cooled in the cooler.

The effective pre-cooling thus preformed inside the rotary kiln at its lower outlet end (in the zone C) is very important, primarily because it causes a reduction in the temperature of the clinker before it reaches the clinker cooler 2. Without this fall in temperature of the clinker outside the clinker cooler, the cooler may well be damaged by contact with the hot clinker.

The effectiveness of the pre-cooling involved is dependent upon the amount of cooling air passed through the pre-cooling zone C per time unit. Thus a feature of the present invention is to increase this amount of air beyond that applied hitherto, with the result that the gas velocity through the kiln is also increased. This increase in gas velocity is obtained by providing not only the last stage of heat exchanger unit A with a calcination chamber 10a as previously proposed, but by providing such a calcination chamber also as the last stage of heat exchanger unit B.

The provision of the calcination chamber 10b will mean that an amount of cooling air being sucked into the kiln and containing sufficient oxygen to nourish the combustion of the fuel introduced through the mouth of the burner pipe 4 will no longer suffice. An extra amount of air containing oxygen enough to nourish the combustion of the fuel added at 14b will also be required, and so the total amount of used cooling air passing from hood 3 into the kiln 1 will be increased as desired. The amount of gas (containing some oxygen) passing through conduit 6 will be increased correspondingly, but the amount of used cooling air passing through conduit 7 will be decreased correspondingly.

The increased amount of combustion gas passed through the kiln in addition to improving the efficiency of the pre-cooling of the clinker also causes a useful reduction in the concentration of the alkalis in the kiln combustion gas.

Still other advantages are related to the incorporation of a calcination chamber in each heat exchanger unit A and B with the consequent increase in surplus air being passed into the kiln outlet. If the cement raw materials contain sulphur it may be released therefrom during the heat treatment in the kiln and give rise to encrustations in the riser pipe leading the exhaust gas away from the kiln. An increase in the amount of surplus air passed into the kiln will reduce the tendency of the sulphur to be released from the raw material. A greater part of the sulphur will therefore remain in the raw material and be found as sulphur compounds in the clinker, where it will cause no harm.

Figure 2:
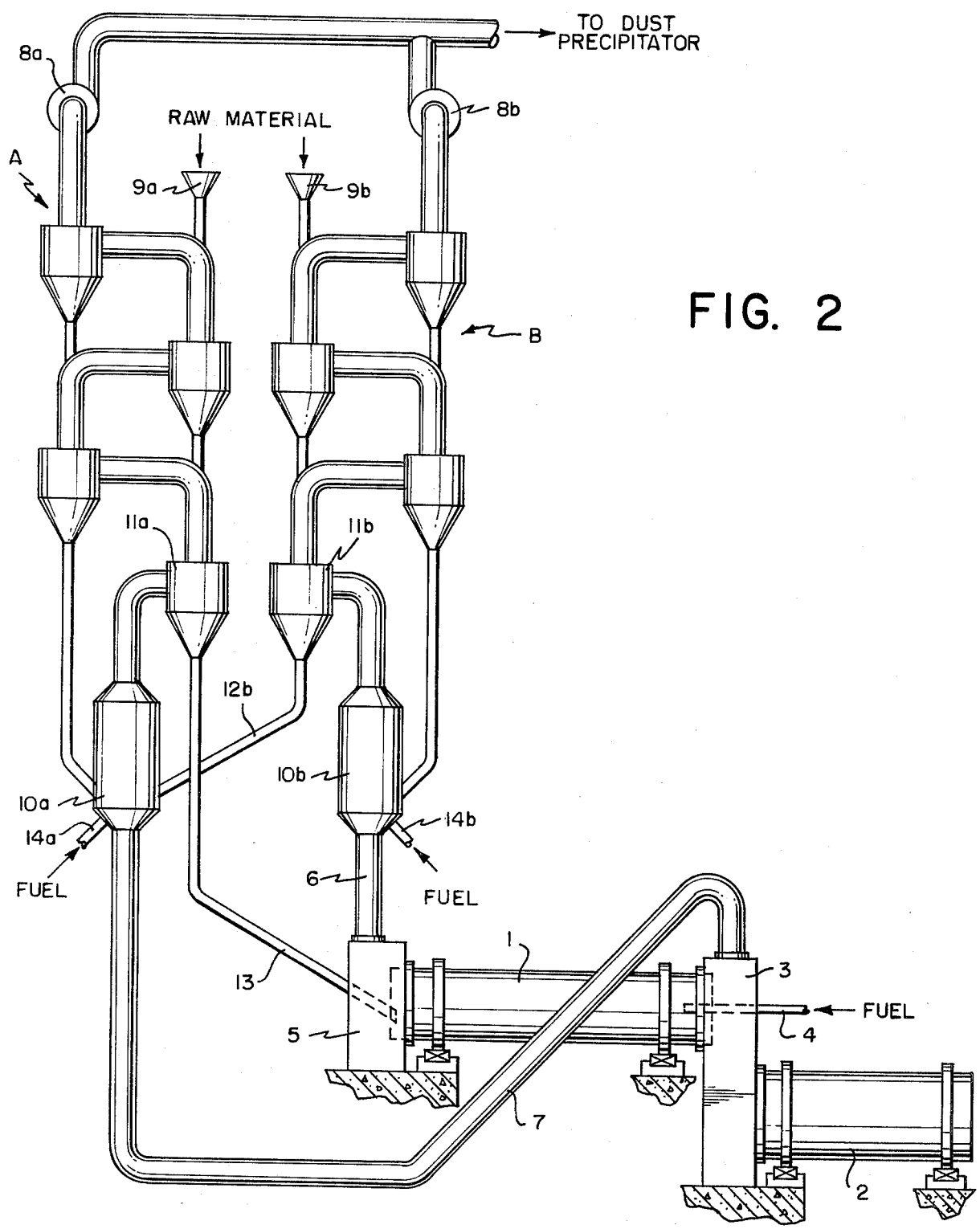
FIG. 2 is a side elevation of an alternate embodiment of the invention.
Figure 3:
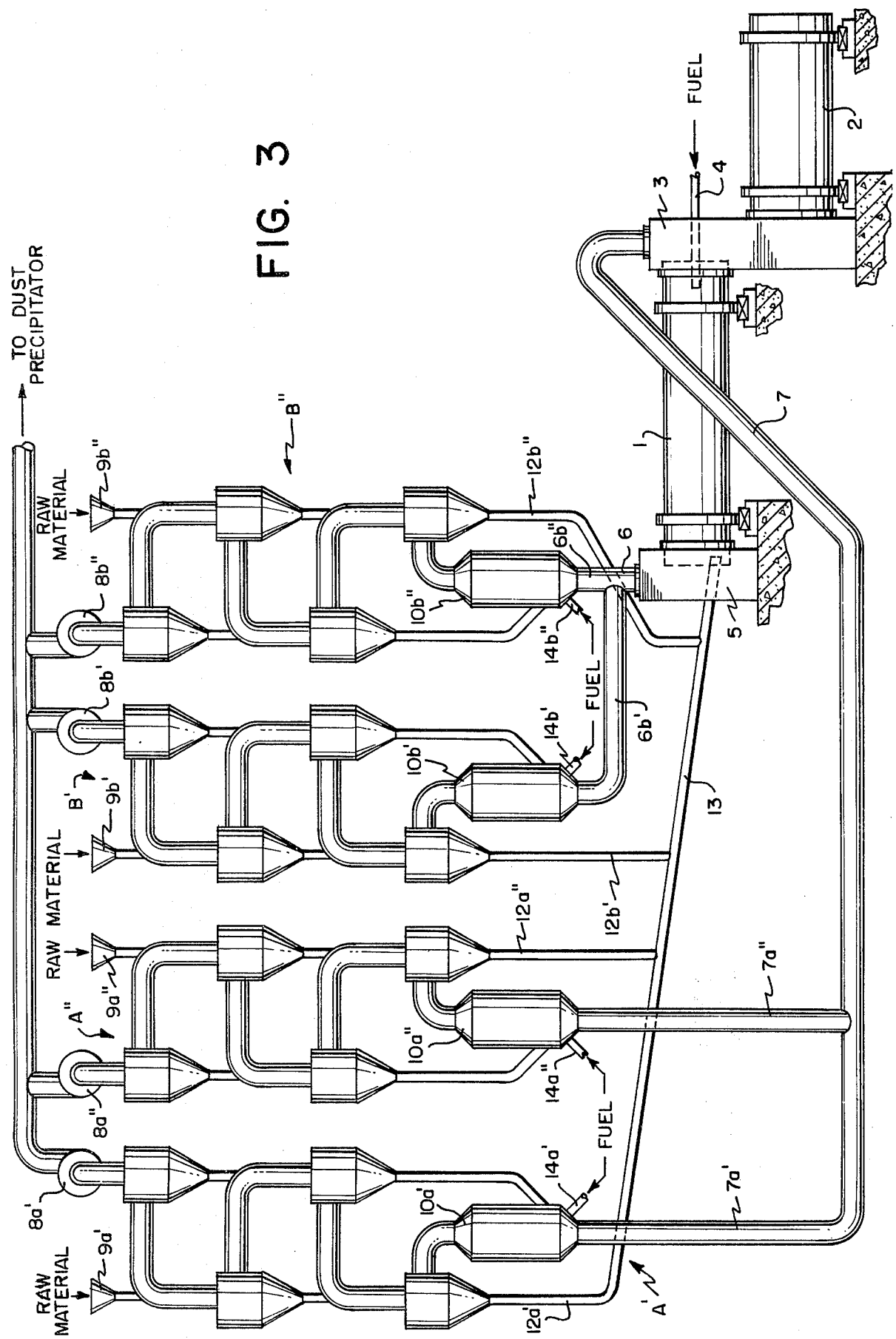
FIG. 3 is side elevation of an alternate embodiment of the invention utilizing four separate heat exchanger units cooperating in parallel.
Figure 4:
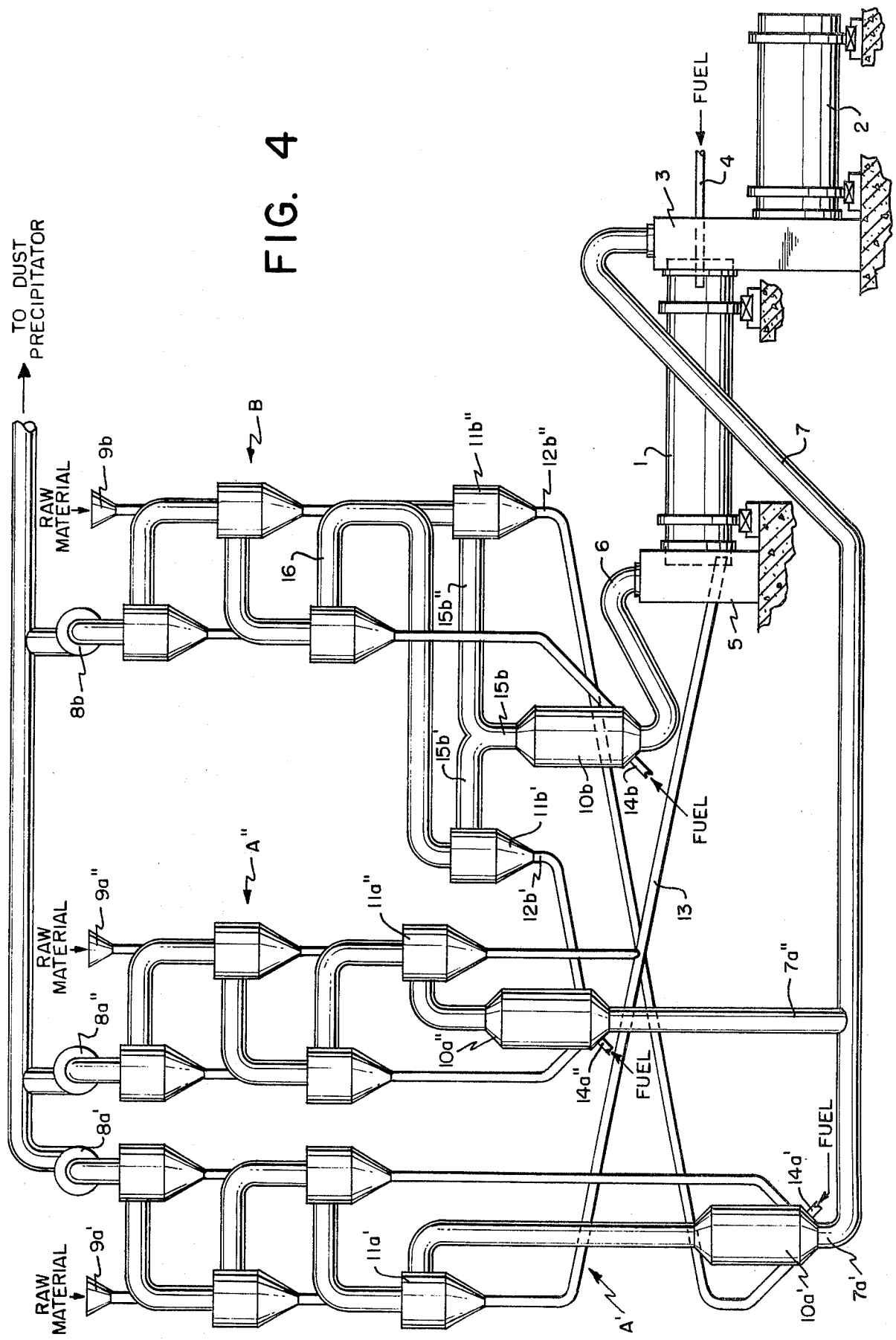
FIG. 4 is a side elevation of a plant similar to the plant of FIG. 2 having three heat exchanger units cooperating in parallel.

In FIGS. 2, 3 and 4, alternate embodiments are illustrated in which components corresponding to the components of FIG. 1 bear the same reference material as in that FIG. The plant shown in FIG. 2 differs primarily from that of FIG. 1 by the fact that the calcination taking place in the calcination chamber 10b is not as extensive as the calcination taking place in he calcination chamber 10b in the plant according to FIG. 1. Further, the calcination taking place in calcination chamber 10b of FIG. 2 is not as extensive as the calcination taking place in calcination chamber 10a of FIG. 2. In the plant according to FIG. 2 the material having been slightly calcined in the calcination chamber 10b provided in the heat exchanger unit B, is directed through a pipe 12b into the calcination chamber 10a provided in the heat exchanger unit A. This slightly calcined material is fully —or almost fully —calcined therein together with the preheated material coming from the first stages of the heat exchanger unit A. (According to FIG. 1 both pipe 12a and pipe 12b open into a pipe 13 leading to the kiln 1.)

The plant according to FIG. 2 may be used to advantage when the demand for an increased gas velocity in the kiln is not so pronounced as to require a plant according to FIG. 1 as the natural solution.

In the plant according to FIG. 2 the fuel supply pipe 14b (but not 14a) may alternatively be dispensed with. In such case the calcination chamber has no fuel supply of its own to produce the heat required for carrying through the calcination. Instead, an amount of fuel in excess of that required for carrying through the sintering process in the rotary kiln is supplied through the burner pipe 4. The total amount of fuel thus supplied is burned off at the mouth of this pipe so as to produce combustion gas having a heat content and temperature sufficient for carrying through both the sintering process in the kiln 1 and the partial calcination process in the calcination chamber 10b.

Theoretically, the same alternative procedure might be made use of in the plant shown in FIG. 1, but in practice the temperature of the gas passing out of the kiln 1 and entering the conduit 6 would be higher than the kiln mouth and the riser pipe can withstand. The more extensive the calcination taking place in calcination chamber 10b, the higher the temperature of the gas.

The plant shown in FIG. 3 corresponds rather closely to that shown in FIG. 1, the only difference being that each of the heat exchanger units A and B has been split up into two parallel units co-operating in parallel. For example heat exchanger unit A of FIG. 1 corresponds to A' and A" of FIG. 3 on one hand and heat exchanger B of FIG. 1 corresponds to B' and B" of FIG. 3 on the other hand.

FIG. 3 has been added to show that both the heat exchanger unit of category A and that of category B may be divided into two units each. When according to FIG. 1 (and to FIG. 2) an extensive calcination is carried through in the calciantion chamber 10b belonging to heat exchanger unit B (and in calcination chambers 10b' and 10b" belonging to heat exchanger units B' and B") almost equal amounts of air or gas will flow through conduit 7 and conduit 6, respectively, per time unit.

The plant shown in FIG. 4 corresponds rather closely to that shown in FIG. 2 with the main difference being that the heat exchanger unit A (but not the heat exchanger unit B) has been split up into two separate units, A' and A", respectively, co-operating in parallel. According to FIG. 2 the raw material is only slightly calcined in the calcination chamber 10b and the slightly calcined material is then conveyed through the pipe 12b to the calcination chamber 10a for further calcination. A corresponding arrangement is employed in FIG. 4, but in this case there is one calcination chamber only (that is to say 10b) of category B, and two calcination chambers (10a' and 10a", respectively) of category A. Because of this arrangement special measures must be taken which will be described below in greater detail.

The additional measures referred to consist in splitting-up the gas discharge pipe 15b from the calcination chamber 10b into two branches 15b' and 15b", and connecting each branch to a cyclone separator 11b' and 11b", respectively. The measures further comprise connecting the bottom discharge end of separator 11b' to separator 10a" by means of a pipe 12b' and connecting the bottom discharge end of separator 11b" to separator 10a'. A conduit 16 connects the two cyclone separators 11b' and 11b" with the preheating stage of unit B. At its lower end the conduit 16 is divided into two branches, each of which is connected to the top of their respective cyclone separators 11b' and 11b".

When, as in this case, only a slight calcination is carried out in the B-calcination chamber the amount of air or gas passing per time unit through a B-unit will only comprise about half the amount passed through the A-units. However, as there are two A-units and only one B-unit about one third will pass through each unit. The fans 8a', 8a" and 8b' will have to be regulated accordingly.

I claim:

1. A method of heat treating granular or pulverulent raw material by means of a suspension heat exchanger connected to the material inlet end portion of a rotary kiln having a burner pipe extending into the material outlet end portion, said heat exchanger including at least first and second multi-stage string preheating units operating in parallel, each of said units having at least one cyclone preheater stage defining a heat exchange zone in which the granular or pulverulent raw material is brought into heat exchange relationship with hot gases and a lowermost calcination stage for preheating and at least partially calcining the raw material, means to supply raw material to each of said multi-stage string preheater units, means for directing the preheated, at least partially calcined raw material to said material inlet end portion of said rotary kiln for sintering, and cooling means communicating with said rotary kiln defining a heat exchange zone in which the sintered material is brought into heat exchange relationship with cooling air comprising:
  a. directing raw material to said multi-stage string preheating units for preheating and at least partially calcining the material;
  b. feeding preheated, at least partially calcined material from said heat exchanger into said rotary kiln;
  c. sintering the preheated, at least partially calcined material in said kiln;
  d. directing the sintered material from said kiln into said communicating cooling means;
  e. directing cooling air into said cooling means so as to contact said sintered material to effect a heat exchange between the sintered material and the cooling air thereby at least partially cooling the sintered material and at least partially heating the cooling air;
  f. dividing the heated cooling air exiting the cooling means and directing a first portion of said heated cooling air to at least one of said calcination stages of at least a first of said multi-stage preheating units of said heat exchanger and directing a second portion thereof to said kiln in excess of that required to support combustion of fuel in the kiln for the sintering process thereby creating an intensified material cooling zone between the mouth of said burner pipe and the material exit end portion of said rotary kiln;
  g. directing hot kiln exit gases to said calcination stage of at least a second of said multi-stage string preheating units; and
  h. directing fuel to at least one of said calcination stages of said multi-stage string preheating units to support combustion with at least partially heated cooling air and thereby provide supplementary heating and at least partial calcining of said preheated material.

2. The method of heat treating granular or pulverulent raw material according to claim 1 further comprising: controlling the division of waste cooling air from said cooling means in a manner to divide, according to predetermined proportions, said waste cooling air between said kiln and each unit fed directly with waste cooling air thereby intensifying the effectiveness of said material cooling zone within said kiln.

3. The method of heat treating granular or pulverulent raw material according to claim 2 further comprising partially calcining the raw material in a first calcination stage of one heat exchanger unit fed with kiln exhaust gases and feeding said partially calcined material from said first calcination stage to the calcination stage of at least one other unit of said heat exchanger fed directly with waste cooling air from said cooling means thereby further calcining said material prior to feeding it into said kiln.

4. The method of heat treating granular or pulverulent raw material according to claim 2 further comprising:
  a. feeding fuel into said kiln in excess of the amount needed to complete the sintering process therein; and
  b. at least partially heating the material fed to the calcination stage of said at least one heat exchanger unit fed with kiln exhaust gases by the combustion of said excess fuel passing through said kiln and directed to said calcination stage.

5. The method of heat treating granular or pulverulent raw material according to claim 2 further comprising directing fuel to said calcination stage of at least each multi-stage string preheating units to which hot kiln exit gases are directed for heating raw material in said calcination stage by local combustion of said fuel.

6. The method of heat treating granular or pulverulent raw material according to claim 2 further comprising substantially completely calcining the raw material prior to feeding it into said kiln and maintaining said second portion of said heated cooling air at approximately twice the amount of said first portion of said heated cooling air.

7. The method of heat treating granular or pulverulent raw material according to claim 6 further comprising partially calcining the raw material in a first calcination stage of one heat exchanger unit fed with kiln exhaust gases and feeding said partially calcined raw material from said first calcination stage to the calcination stage of at least one other unit of said heat exchanger fed directly with waste cooling air from said cooling means thereby further calcining said material prior to feeding it into said kiln.

8. The method of heat treating granular or pulverulent raw material according to claim 1 wherein the preheated material is substantially completely calcined prior to feeding it into said kiln.

9. The method of heat treating granular or pulverulent raw material according to claim 8 further comprising partially calcining the raw material in a first calcination stage of one heat exchanger unit fed with kiln exhaust gases and feeding said partially calcined raw material from said first calcination stage to the calcination stage of at least one other unit of said heat exchanger fed directly with waste cooling air from said cooling means thereby further calcining said material prior to feeding it into said kiln.

10. The method of heat treating granular or pulverulent raw material according to claim 8 further comprising:
  a. feeding fuel into said kiln in excess of the amount needed to complete the sintering process therein; and
  b. at least partially heating the material fed to the calcination stage of said at least one heat exchanger unit fed with exhaust gases by the combustion of said excess fuel passing through said kiln and directed to said calcination stage.

11. The method of heat treating granular or pulverulent raw material according to claim 8 further comprising directing fuel to said calcination stage of at least each multi-stage string preheating units to which hot kiln exit gases are directed for heating raw material in said calcination stage by local combustion of said fuel.

12. The method of heat treating granular or pulverulent raw material according to claim 1 further comprising:
  a. feeding fuel into said kiln in excess of the amount needed to complete the sintering process therein; and
  b. at least partially heating the material fed to the calcination stage of said at least one heat exchanger unit fed with kiln exhaust gases by the combustion of said excess fuel passing through said kiln and directed to said calcination stage.

13. The method of heat treating granular or pulverulent raw material according to claim 12 further comprising directing fuel to said calcination stage of at least each multi-stage string preheating units to which hot kiln exit gases are directed for heating raw material in said calcination stage by local combustion of said fuel.

14. The method of heat treating granular or pulverulent raw material according to claim 1 further comprising partially calcining the raw material in a first calcination stage of one heat exchanger unit fed with kiln exhaust gases and feeding said partially calcined raw material from said first calcination stage to the calcination stage of at least one other unit of said heat exchanger fed directly with waste cooling air from said cooling means thereby further calcining said material prior to feeding it into said kiln.

15. The method of heat treating granular or pulverulent raw material according to claim 1 further comprising:
   a. feeding fuel into said kiln in excess of the amount needed to complete the sintering process therein; and
   b. at least partially heating the material fed to the calcination stage of said at least one heat exchanger unit fed with exhaust gases by the combustion of said excess fuel passing through said kiln and directed to said calcination stage.

16. The method of heat treating granular or pulverulent raw material according to claim 1 further comprising: directing fuel to said calcination stage of at least each multi-stage string preheating units to which hot kiln exit gases are directed for heating raw material in said calcination stage by local combustion of said fuel.

17. A method of heat treating granular or pulverulent raw material in the form of cement raw meal by means of a suspension heat exchanger connected to the material inlet end portion of a rotary kiln having a burner pipe extending into the material outlet end portion, said heat exchanger including at least two multi-stage cyclone string preheater units operating in parallel, each of said units having at least an uppermost cyclone preheater stage defining a heat exchanger zone in which the granular or pulverulent raw material is brought into heat exchange relationship with hot gases and a lowermost calcination stage for preheating and at least partially calcining the raw material, means to supply raw material to each of said multi-stage string preheater units, means for directing the preheated, at least partially calcined raw material to the material inlet end portion of said rotary kiln for sintering, and cooling means positioned and adapted to receive sintered material from said rotary kiln and defining a heat exchange zone in which the sintered material is brought into heat exchange relationship with cooling air comprising:
   a. directing the raw material to said multi-stage preheater units for preheating and at least partially calcining the material;
   b. feeding preheated at least partially calcined material from said lowermost cyclone preheater stage of said first string preheater to said calcination stage of said second string preheater;
   c. further calcining said at least partially calcined material in said calcination stage of said second string preheater;
   d. feeding preheated material from the penultimate cyclone preheater stage of said second string preheater to said calcination stage of said second string preheater;
   e. feeding preheated, at least partially calcined material from said calcination stage of said second string preheater to the lowermost cyclone preheater stage of said second string preheater;
   f. feeding preheated, at least partially calcined material from said lowermost cyclone preheater stage of said second string preheater of said heat exchanger to said material inlet end portion of said rotary kiln;
   g. burning the preheated, at least partially calcined material in said rotary kiln;
   h. directing the burnt material from said rotary kiln into said material cooling means communicating with said rotary kiln and adapted to receive material burnt in said kiln for cooling therein;
   i. directing cooling air into said cooling means countercurrent to the flow of material therein and in a manner to effect a heat exchange between said burnt material and said cooling air thereby at least partially cooling said burnt material and at least partially heating said cooling air;
   j. dividing the heated cooling air exiting the material cooling means and directing a first portion of said heated cooling air to said calcination stage associated with said second string preheater and the remaining portion thereof to said rotary kiln to support combustion of fuel therein;
   k. directing a second portion of said heated cooling air to said calcination stage of said second multi-stage string preheater;
   k. directing hot kiln exit gases to the lowermost calcination stage associated with said first string preheater;
   m. directing fuel to said calcination stage of at least said second string preheater and burining said fuel at least in said calcination stage while supporting combustion in said calcination stages of said first and second string preheaters with heated cooling air from said material cooling means and from said kiln; and
   m. adjustably controlling the flow of heated cooling air through each of said string preheaters so as to divide the heated cooling air passing therethrough such that the heated cooling air passing through said rotary kiln is in excess of that required to support combustion of fuel for the burning process in the kiln thereby creating an intensified material cooling zone between the mouth of said burner pipe and the material outlet end portion of said rotary kiln.

18. A method of heat treating granular or pulverulent raw material in the form of cement raw meal by means of a suspension heat exchanger connected to the material inlet end portion of a rotary kiln having a burner pipe extending into the material outlet end portion, said heat exchanger including at least three multi-stage cyclone string preheater units operating in parallel, each of said units having at least an uppermost cyclone preheater stage defining a heat exchanger zone in which the granular or pulverulent raw material is brought into heat exchange relationship with hot gases and a lowermost calcination stage for preheating and at least partially calcining the raw material, means to supply raw material to each of said multi-stage string preheater units, means for directing the preheated, at least partially calcined raw material to the material inlet end portion of said rotary kiln for sintering, and cooling means positioned and adapted to receive sintered material from said rotary kiln and defining a heat exchange zone in which the sintered material is brought into heat exchange relationship with cooling air comprising:

a. directing the raw meal to said heat exchanger to effect a preheating and at least a partial calcination of the material;

b. feeding peheated, at least partially calcined raw meal from the first two string preheaters to a rotary kiln;

c. feeding preheated, at least partially calcined raw meal from one cyclone preheater of the last preheater stage of said third string preheater to the calcining stage associated with said second string preheater;

d. feeding preheated, at least partially calcined raw meal from the other preheater cyclone of said third string preheater to the calcining stage associated with said first string preheater;

e. burning the preheated, at least partially calcined raw meal in said rotary kiln;

f. directing the burnt material from the kiln into cooling means communicating with the kiln;

g. directing cooling air into said cooling means in a manner to effect a heat exchange between the burnt material and the cooling air;

h. dividing the heated cooling air leaving the cooling means and directing a portion of said heated cooling air to the calcining stage associated with each of said first two string preheaters and the remaining portion of heated cooling air to said rotary kiln to support the combustion of fuel therein, the remaining portion being in excess of that required to support combustion of fuel for the burning process in the kiln and thereby creating an intensive material cooling zone between the mouth of said burner pipe and the material outlet end portion of said rotary kiln;

i. directing the hot kiln exit gases to the lowermost calcining chamber associated with said third string preheater;

j. directing fuel to each calcining stage of said string preheaters and burning said fuel in said calcining stages while supporting combustion in first and second chambers with preheated cooling air from said cooling means and in the third chamber with excess heated cooling air passing through said kiln; and k. controlling the flow of gases through each of said string preheaters and maintaining the flow of gases therethrough at levels capable of maintaining the deposits of alkalis therein at predetermined desired levels.

19. A method of heat treating granular or pulverulent raw material in the form of cement raw meal by means of a suspension heat exchanger connected to the material inlet end portion of a rotary kiln having a burner pipe extending into the material outlet end portion, said heat exchanger including at least four multi-stage cyclone string preheater units operating in parallel, each of said units having at least an uppermost cyclone preheater stage defining a heat exchanger zone in which the granular or pulverulent raw material is brought into heat exchange relationship with hot gases and a lowermost calcination stage for preheating and at least partially calcining the raw material, means to supply raw material to each of said multi-stage string preheater units, means for directing the preheated, at least partially calcined raw material to the material inlet end portion of said rotary kiln for sintering, and cooling means positioned and adapted to receive sintered material from said rotary kiln and defining a heat exchange zone in which the sintered material is brought into heat exchange relationship with cooling air comprising:

a. directing the raw meal to said heat exchanger to effect a preheating and at least a partial calcination of the material;

b. feeding preheated, at least partially calcined raw meal from each preheater string to a common conduit;

c. feeding the preheated meal through the common conduit into a rotary kiln;

d. burning the preheated, at least partially calcined raw meal in said rotary kiln;

e. directing the burnt material from the rotary kiln into a cooler communicating with the kiln;

f. directing cooling air into said cooler in a manner to effect a heat exchange between the burnt material and the cooling air;

g. dividing the heated cooling air leaving the cooler and directing a portion of said heated cooling air into two of said calcination stages associated respectively with a first two of said preheater strings, and directing the remaining portion of said heated cooling air to said rotary kiln in excess of that required to support combustion of fuel in the kiln for the burning process, thereby creating an intensive material cooling zone between the mouth of said burner pipe and the material outlet portion of said rotary kiln;

h. directing hot kiln exit gases to the calcining stages of said remaining two string preheaters;

i. directing fuel to each calcining stage of said string preheaters and burning said fuel in said calcining stages while supporting combustion in two of said stages with preheated cooling air from said cooler and supporting combustion in the remaining two stages with excess heated cooling air passing through said kiln; and j. controlling the flow of gases through each string of said last heat exchanger units so as to control the division of waste cooling air between said rotary kiln and said string preheaters and maintaining the flow of gases therethrough at levels capable of maintaining alkali deposits therein at predetermined desired minimum levels.

20. A plant for heat treating granular or pulverulent raw material which comprises:

a. a heat exchanger having at least two preheating units operating in parallel relation, each preheating unit having at least a first preheater stage for preheating raw material, and at least a lowermost calcination stage to at least partially calcine the preheated raw material;

b. an inclined rotary kiln communicating with said exchanger and adapted and positioned to receive preheated, at least partially calcined material from said heat exchanger for sintering, said kiln having a material discharge end portion and a burner pipe extending into the material discharge end portion;

material cooling means communicating with the material discharge end portion of said rotary kiln and adapted to receive sintered material discharged from said material discharge end portion of said kiln;

d. means for dividing waste heated cooling air leaving the cooling means and for directing at least a portion of said cooling air to at least one of said calcination chambers of said heat exchanger and a portion to said kiln in excess of the air required to support combustion in the kiln for the sintering process, said excess cooling air thereby creating an intensive material cooling zone between the mouth of said burner pipe and the material outlet end portion of said rotary kiln;

e. means to direct hot kiln exit gases to at least one calcination stage of said heat exchanger; and f. means to supply fuel to at least one of said calcination stages to support combustion therein with preheated cooling air to provide supplementary heat for said material and to at least partially calcine said preheated material.

21. The plant for heat treating granular or pulverulent raw material according to claim 20 further comprising means at the gas outlet portion of each preheating unit for controlling the gas flow through the preheating units in a manner to control the division of waste cooling air between said kiln and each unit fed directly therewith.

22. The plant for heat treating granular or pulverulent raw material according to claim 21 wherein each calcination chamber having a gas inlet portion communicating with the gas outlet portion of said kiln is provided with means for supplying fuel to said calcination chamber to provide combustion and heating of raw material therein.

23. The plant for heat treating granular or pulverulent raw material according to claim 22 wherein each unit of said heat exchanger has positioned adjacent the gas outlet end portion, a fan and associated regulable damper connected thereto, for controlling the flow of hot gas through the unit.

24. The plant for heat treating granular or pulverulent raw material according to claim 22 wherein each unit of said heat exchanger has positioned adjacent the gas outlet end portion, a variable fan for controlling the flow of hot gas through the unit.

25. The plant for heat treating granular or pulverulent raw material according to claim 24 wherein said adjustable means for controlling the flow of gases through each unit comprises an adjustable fan.

26. The plant for heat treating granular or pulverulent raw material according to claim 22 wherein at least one preheating unit of said heat exchanger comprises means connecting the gas inlet portion thereof to the exhaust gas outlet portion of said kiln with means being provided for feeding preheated, at least partially calcined material from said preheating unit to the calcination chamber of at least one preheating unit of said heat exchanger having the hot gas inlet portion thereof connected directly to the exhaust end portion of the material cooling means so as to provide further calcination of said material.

27. The plant for heat treating granular or pulverulent raw material according to claim 26 wherein each unit of said heat exchanger has positioned adjacent the gas outlet end portion, a variable fan for controlling the flow of hot gas through the unit.

28. The plant for heat treating granular or pulverulent raw material according to claim 27 wherein said adjustable means for controlling the flow of gases through each unit comprises an adjustable fan.

29. The plant for heat treating granular or pulverulent raw material according to claim 26 wherein at least one preheating unit of said heat exchanger comprises means connecting the gas inlet portion thereof to the exhaust gas outlet portion of said kiln with means being provided for feeding preheated at least partially calcined material therefrom from said preheating unit to the calcination chamber of at least one preheating unit of said heat exchanger having the hot gas inlet portion thereof connected directly to the exhaust end portion of the material cooling means so as to provide further calcination of said material.

30. The plant for heat treating granular or pulverulent raw material according to claim 29 wherein each unit of said heat exchanger has positioned adjacent the gas outlet end portion, a variable fan for controlling the flow of hot gas through the unit.

31. Plant for heat treating granular or pulverulent raw material such as cement raw meal which comprises:

a. a heat exchanger having at least two strings of multi-stage cyclone preheaters operating in parallel relation, each preheater having at least a first cyclone preheater and a last stage formed by a calcination chamber, the calcination chamber being positioned below the last cyclone stage;

b. a rotary kiln communicating with said heat exchanger positioned and adapted to receive preheated, at least partially calcined material from said heat exchanger for sintering the material;

c. a cooler connected to the material discharge end portion of the kiln and adapted to receive sintered material such as cement clinker from said kiln and capable of cooling said sintered material;

d. means for dividing waste heated cooling air leaving the cooling means and for directing a first portion of said cooling air to a first calcination chamber of said heat exchanger associated with a first string preheater, and the remaining portion of said heat cooling air to said kiln to support combustion for the sintering process therein, said cooling air directed to said kiln being in excess of the air required to support combustion in the kiln to thereby create an intensive material cooling zone within said kiln extending from the mouth of the burner pipe to the material discharge end portion of the kiln;

e. means to direct hot kiln exit gases to the calcination chamber of at least one of said other string preheaters of said heat exchanger;

f. means to supply fuel to each calcination chamber to support combustion therein in combination with the preheated cooling air directed to said calcination chambers from said cooler and said rotary kiln respectively, to provide supplementary heat for said material and to at least partially calcine said preheated material therein; and g. means adjacent the gas outlet end portion of each string preheater to control the flow of gas through said preheater string to divide according to predetermined proportions, the waste cooling air directed through said kiln and said preheaters.

32. Plant for heat treating granular or pulverulent raw material in the form of cement raw meal which comprises:

a. a heat exchanger having at least two preheating units operating in parallel relation, the first preheating unit being divided into first and second string preheaters and the second unit forming a third string preheater, each string preheater having a first cyclone preheater stage, at last preheater stage formed of two opposed cyclone preheaters, and a lowermost calcination chamber for at least partially calcining the preheated raw material from the associated string preheater;
b. a rotary kiln communicating with said heat exchanger and adapted and positioned to receive preheated, at least partially calcined material from said heat exchanger for sintering therein;
c. means to direct preheated, at least partially calcined raw material from the first two string preheaters to a common duct and into said kiln for burning therein to form cement clinker;
d. means to direct preheated raw material from the penultimate preheater stage of the first two string preheaters to the calcining chambers associated with said first two string preheaters;
e. means to direct preheated material from the penultimate stage of the third string preheater to the calcining chamber associated with said third string preheater;
f. means to direct preheated, at least partially calcined raw material from at least one of the last cyclone preheaters of said third string preheater to the calcining chamber of said second string preheater, and means to direct preheated, at least partially calcined raw material from the last cyclone preheater of said third string preheater to the calcining chamber of said first string preheater;
g. means to divide waste heated cooling air exiting the cooling means and to direct a portion thereof to the calcining stages of said first and second string preheaters and the remaining portion thereof to the kiln to support combustion in the kiln for the sintering process, the cooling air directed to said kiln being in excess of the cooling air required to support combustion therein to thereby create an intensive material cooling zone between the mouth of the burner pipe of the kiln and the material outlet end portion of the kiln;
h. means to direct the kiln exit gases to the calcining chamber of said third string preheater to support combustion therein;
i. means to supply fuel to each of said calcining chambers to support combustion therein with preheated cooling air so as to provide supplementary heat therein for said material and to at least partially calcine said preheated material therein; and
j. means positioned adjacent the gas outlet end portion of each string preheater to adjustably control the gas flow through the respective string preheater in a manner to control the division of heated cooling air through said kiln and said string preheaters.

33. A plant for heat treating granular or pulverulent raw material in the form of cement raw meal which comprises:
a. a heat exchanger having four strings of multi-stage cyclone suspension preheaters operating in parallel relation, each string preheater having at least a first cyclone preheater stage and a lowermost calcination chamber for at least partially calcining the preheated material;
b. means to feed preheated at least partially calcined raw material from each preheater string to a common conduit, the conduit extending into a rotary kiln to feed the material therein for burning into cement clinker;
c. a clinker cooler communicating with the material outlet end portion of the rotary kiln and positioned and adapted to receive cement clinker from the kiln for cooling by means of air directed therein;
d. means to divide the heated cooling air leaving the cooler and for directing a portion of said heated cooling air to the calcination chambers of two of said string preheaters while directing the remaining portion of heated cooling air to the rotary kiln to support combustion of fuel therein, the portion of heated cooling air directed to said rotary kiln being in excess of that required to support combustion of fuel in the kiln for the burning process, said excess air creating a material cooling zone within said rotary kiln extending approximately from the mouth of the kiln burner pipe to the clinker exit portion of said kiln;
e. means to direct hot kiln exit gases to the calcining chambers of the remaining third and fourth string preheaters;
f. means to direct fuel to each calcining chamber of said string preheaters for burning said fuel in said calcining chambers while supporting combustion in two of said chambers with preheated cooling air from said cooler and supporting combustion in the other two stages with excess heated cooling air passing through said kiln; and
g. means associated with each string preheater for cooling the gas flow through the individual preheater to control the division of waste cooling air between the kiln and the string preheaters.

* * * * *

UNITED STATES PATENT AND TRADEMARK OFFICE
CERTIFICATE OF CORRECTION

PATENT NO. : 4,045,162
DATED : August 30, 1977
INVENTOR(S) : Soren Bent Christiansen It is certified that error appears in the above-identified patent and that said Letters Patent are hereby corrected as shown below:

Column 1, line 12, "technology to the" should read
-- technology pertaining to the --

Column 1, line 16, "February 14, 1975" should read
-- February 4, 1975 --

Column 1, line 42, "utilize the haet" should read
-- utilize the heat --

Column 1, line 44, "Commonly assinged" should read
-- Commonly assigned --

Column 1, line 62, "the wate cooling air" should read
-- the waste cooling air --

Column 2, line 30, "In the accordance" should read
-- In accordance --

Column 2, line 50, "the kiln of for" should read
-- the kiln for --

Column 2, lines 51-52, "intensifying the effectiveness a"
should read -- intensifying the effectiveness of a --

Column 2, line 54, "directing kiln exit gases" should read
-- directing hot kiln exit gases --

Column 3, line 19, "to at leat" should read -- to at least --

Column 3, line 44, "if each has" should read -- if each
unit has --

UNITED STATES PATENT AND TRADEMARK OFFICE
CERTIFICATE OF CORRECTION

PATENT NO. : 4,045,162

DATED : August 30, 1977

INVENTOR(S) : Soren Bent Christiansen

It is certified that error appears in the above-identified patent and that said Letters Patent are hereby corrected as shown below:

Column 3, line 47, "of each kind unit" should read
-- of each kind of unit --

Column 4, line 7, "in the preceeding" should read
-- in the preceding --

Column 4, line 24, "Fig. 1 is side" should read
--Fig. 1 is a side --

Column 4, line 29, "Fig. 3 is side" should read
-- Fig. 3 is a side --

Column 5, lines 43-44, delete "for carrying through the calcination chambers 10a and 10b, respectively."

Column 7, line 26, "the same reference material" should read -- the same reference numerals --

Column 12, line 14, (Claim 17, section (h) "in said kiln" should read -- in said rotary kiln --

Column 12, line 30, (Claim 17, section (k) "k." should read -- l. --

UNITED STATES PATENT AND TRADEMARK OFFICE
CERTIFICATE OF CORRECTION

PATENT NO. : 4,045,162 = Page 3 of 3
DATED : August 30, 1977
INVENTOR(S) : Soren Bent Christiansen It is certified that error appears in the above-identified patent and that said Letters Patent are hereby corrected as shown below:

Column 12, line 40 (Claim 17, section (m) "m." should read -- n. --

Column 14, line 61 (Claim 20, section (b) "material cooling means" should read -- c. material cooling means--

Column 16, line 66, (Claim 32, section (a) "at last preheater stage" should read -- a last preheater stage --

Signed and Sealed this

Third Day of January 1978

[SEAL]

Attest:

RUTH C. MASON
*Attesting Officer*

LUTRELLE F. PARKER
*Acting Commissioner of Patents and Trademarks*